US009058392B1

(12) United States Patent
Pennock et al.

(10) Patent No.: US 9,058,392 B1
(45) Date of Patent: Jun. 16, 2015

(54) CLIENT STATE RESULT DE-DUPING

(75) Inventors: Chris Pennock, Brooklyn, NY (US);
Kumar Mayur Thakur, West Orange, NJ (US)

(73) Assignee: Google Inc., Mountain View, CA (US)

( * ) Notice: Subject to any disclaimer, the term of this patent is extended or adjusted under 35 U.S.C. 154(b) by 217 days.

(21) Appl. No.: 13/427,636

(22) Filed: Mar. 22, 2012

(51) Int. Cl.
*G06F 17/30* (2006.01)

(52) U.S. Cl.
CPC .............................. *G06F 17/30867* (2013.01)

(58) Field of Classification Search
CPC ..................... G06F 17/30867; G06F 17/30864
See application file for complete search history.

(56) References Cited

U.S. PATENT DOCUMENTS

| 5,701,469 | A * | 12/1997 | Brandli et al. ........................ 1/1 |
| 7,051,020 | B2 * | 5/2006 | Dettinger et al. ..................... 1/1 |
| 7,606,791 | B2 * | 10/2009 | Dettinger et al. ..................... 1/1 |
| 7,720,845 | B2 * | 5/2010 | Stata et al. ..................... 707/732 |
| 8,560,509 | B2 * | 10/2013 | Xia et al. ....................... 707/696 |
| 2007/0112817 | A1 * | 5/2007 | Danninger .................... 707/101 |
| 2008/0005070 | A1 * | 1/2008 | Malik ............................... 707/3 |
| 2008/0086755 | A1 * | 4/2008 | Darnell et al. ................. 725/105 |
| 2008/0140621 | A1 * | 6/2008 | Martinez et al. .................. 707/3 |
| 2011/0055191 | A1 * | 3/2011 | Bain .............................. 707/706 |
| 2011/0191314 | A1 * | 8/2011 | Howes et al. .................. 707/706 |
| 2012/0130975 | A1 * | 5/2012 | Piao et al. ...................... 707/706 |

OTHER PUBLICATIONS

Agarwal et al., "URL Normalization for De-duplication of Web Pages," Proceedings of the 18th ACM conference on Information and knowledge management, Nov. 2-6, 2009, pp. 1987-1990.
Broder, "On the resemblance and containment of documents," In Proceedings Compression and Complexity of Sequences 1997, Jun. 11-13, 1997, pp. 21-29.
Koppula et al., "Learning URL Patterns for Webpage De-duplication," Proceedings of the third ACM international conference on Web search and data mining, Feb. 4-6, 2010, pp. 381-390.

* cited by examiner

*Primary Examiner* — Richard Bowen
(74) *Attorney, Agent, or Firm* — Fish & Richardson P.C.

(57) ABSTRACT

Methods, systems, and computer-readable media for client state result de-duping may comprise receiving from a client a first query comprising one or more search terms; obtaining from a data store a first list of search results relevant to the one or more search terms; generating state information representing the first list of search results; sending a first response to the client that includes the first list of search results and the state information; receiving from the client a second query comprising the one or more search terms and the state information; obtaining a second list of search results comprising items that have been added to the data store since the first query; removing from the second list of search results one or more search results represented by the received state information; and sending a second response to the client that includes the second list of search results.

22 Claims, 9 Drawing Sheets

CLIENT STATE RESULT DE-DUPING

BACKGROUND

The present disclosure relates to providing search results. Search engines typically operate by downloading third-party webpages and indexing their content within one or more search indexes. Some search engines populate the collection of webpages they index using one or more web crawlers that discover new webpages by following hyperlinks embedded within indexed webpages. Although web crawling may be effective for discovering a large number of webpages that might otherwise be difficult to locate within the world wide web, in some cases, web crawling may not be effective for indexing webpages in a timely manner.

For example, if a content provider publishes a new webpage containing news about a recent event, that webpage might not be indexed until days after its creation, if a search engine must rely solely on web crawling to discover its existence. As a result, the search engine may be limited in its ability to provide search results associated with webpages that were only recently created or modified prior to a client's search request. Moreover, even for webpages that have been indexed, it may be difficult for users to follow minute-by-minute developments with respect to a topic if content has been duplicated across multiple webpages.

Accordingly, search engines may be improved by techniques for providing streaming, non-duplicative search results to client devices in an automatic manner as new or modified relevant webpages are added to one or more search indexes.

SUMMARY

The present disclosure addresses these and other improvements to search engine technology. In some implementations, a server or server system may receive from a client a first query that includes one or more search terms. The server may obtain from a data store a first list of search results relevant to the one or more search terms and may generate state information representing the first list of search results. The server may send to the client a first response that includes the first list of search results and the state information.

At a later time, the server may receive from the client a second query that includes the one or more search terms and the state information. The server may obtain from the data store a second list of search results relevant to the one or more search terms that represents items that have been added to the data store since the first query. The server may remove from the second list of search results one or more search results represented by the received state information. The server may then send a second response to the client in response to the second query that includes the second list of search results.

In some implementations, the first list of search results represents items that have been added to the data store within a specified period of time before the first query. In some implementations, the first response further comprises a list of search results most relevant to the search terms. In some implementations, the server or server system further modifies the state string to encode information representing the second list of search results. In some implementations, the second response further comprises the modified state string.

In some implementations, generating the state information comprises encoding information representing URLs associated with the first list of search results. In some implementations, removing the one or more search results comprises removing from the second list of search results one or more search results having URLs represented by the state information. In some implementations, generating the state information comprises encoding information representing content associated with the first list of search results. In some implementations, removing the one or more search results comprises removing from the second list of search results one or more search results having content represented by the state information.

In some implementations, the server further incorporates the state information into a polling URL that includes the one or more search terms and sends the polling URL to the client as part of the first response. In some implementations, the first response further comprises client-executable code that instructs the client to send the second query using the polling URL. In some implementations, the client-executable code further instructs the client to send periodic queries for updated search results.

In some implementations, the client-executable code comprises JavaScript configured for execution in a web browser application. In some implementations, the data store comprises one or more search indexes, and the first list of search results and the second list of search results represent webpages indexed in the one or more search indexes. In some implementations, the first query and/or the second query may be HTTP requests, and the first response and/or the second response may be HTTP responses. The present disclosure also includes a server or server system configured to perform any of the foregoing operations.

In some implementations, a client device may perform or may be configured to perform operations comprising: sending to a server system a first query comprising one or more search terms; receiving from the server system a first response comprising: a first list of search results representing items in a data store relevant to the one or more search terms; state information representing the first list of search results; and client-executable code; displaying search results from the first list of search results in graphical results area; and executing the client-executable code, wherein executing the client-executable code comprises: waiting for a specified period of time; sending to the server system a second query comprising the one or more search terms and the state information; receiving from the server system a second response comprising a second list of search results representing items relevant to the one or more search terms that have been added to the data store since the first query and that are non-duplicative of the first list of search results; and updating the graphical results area to display search results from the second list of search results.

BRIEF DESCRIPTION OF THE DRAWINGS

The accompanying drawings, which are incorporated in and constitute a part of this specification, illustrate various implementations of the invention and, together with the description, serve to explain the principles of the invention. In the drawings.

DETAILED DESCRIPTION

The following detailed description refers to the accompanying drawings. Wherever convenient, the same reference numbers are used in the drawings and the following description to refer to the same or similar parts. While several example implementations and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
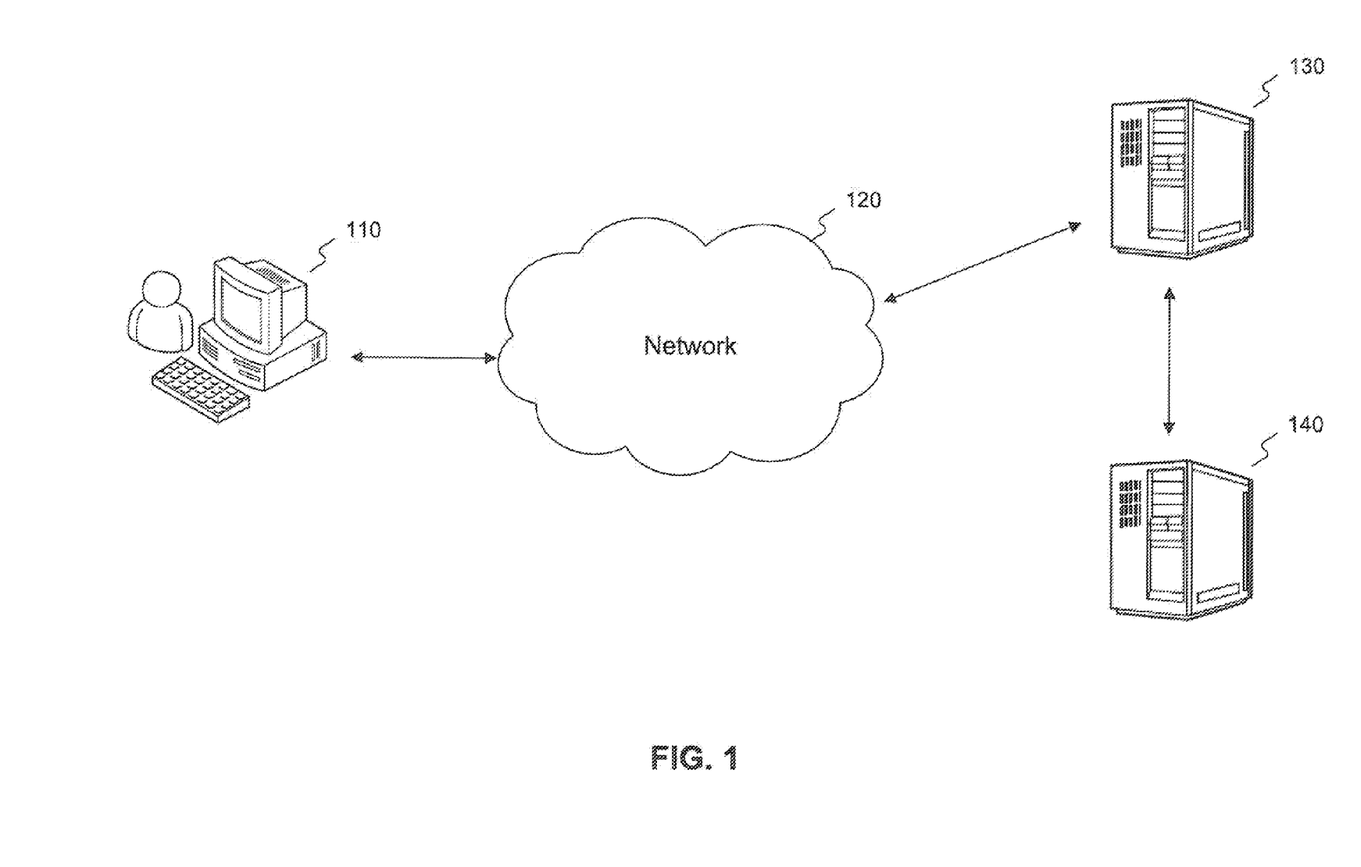
FIG. 1 is a diagram depicting an example network arrangement in which a client device may receive streaming search results from a search engine, consistent with certain disclosed implementations.

FIG. 1 is a diagram depicting an example network arrangement in which a client device may receive streaming search results from a search engine, consistent with certain disclosed implementations. As depicted in FIG. 1, a client device 110, such as a personal computing device or mobile device, may request search results from a search engine by communicating with the search engine through a network 120, such as the Internet. The search engine may comprise one or more search engine servers 130, configured to receive search requests from client devices and to provide search results to the requesting client devices, and one or more search index servers 140, configured to index web pages and to provide search results relevant to keywords or search terms to one or more search engine servers 130 for transmission to client devices. Search engine servers 130 may communicate with search index servers 140 directly—e.g., through a private communication link—or through a public network 120.

Those skilled in the art will appreciate that the foregoing network arrangement is merely one example of a possible network arrangement. For example, in some implementations, search engine server 130 and search index server 140 may be identical (i.e., a single server or device).

Figure 2A:
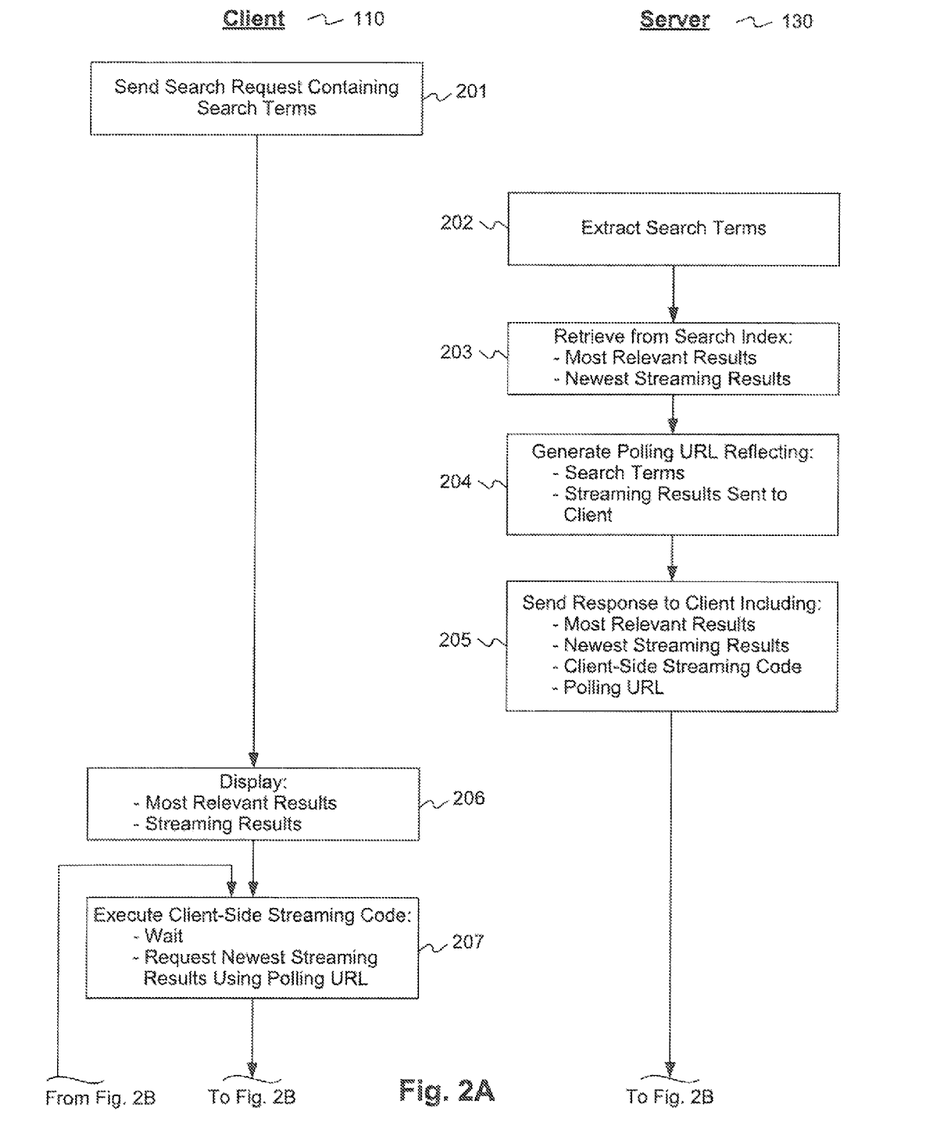
FIG. 2A is a flow diagram depicting an example method of providing a client device with streaming, non-duplicative search results, consistent with certain disclosed implementations.
Figure 2B:
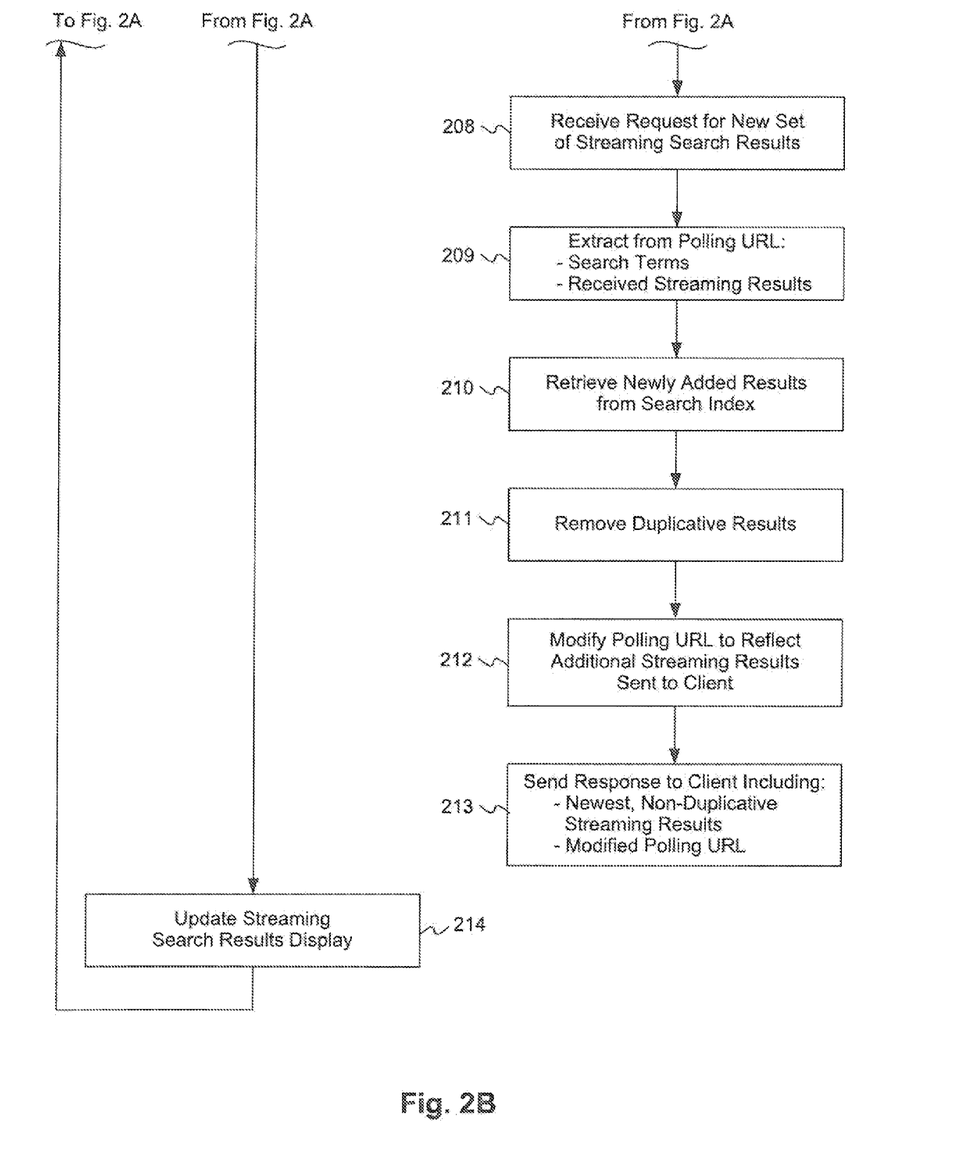
FIG. 2B is a flow diagram depicting an example method of providing a client device with streaming, non-duplicative search results, consistent with certain disclosed implementations.

FIGS. 2A and 2B are flow diagrams depicting an example method of providing a client device with streaming, non-duplicative search results, consistent with certain disclosed implementations. FIGS. 2A and 2B depict various operations that may be performed by a client device (such as client device 110) and a server (such as search engine server 130), as further illustrated by FIGS. 3-7. The process may begin in step 201, when a client 110 sends a search request to server 130 that includes one or more search terms. Client 110 may transmit the search request to server 130 in any manner, whether automated or user-driven, and using any communication protocol.

Figure 3:
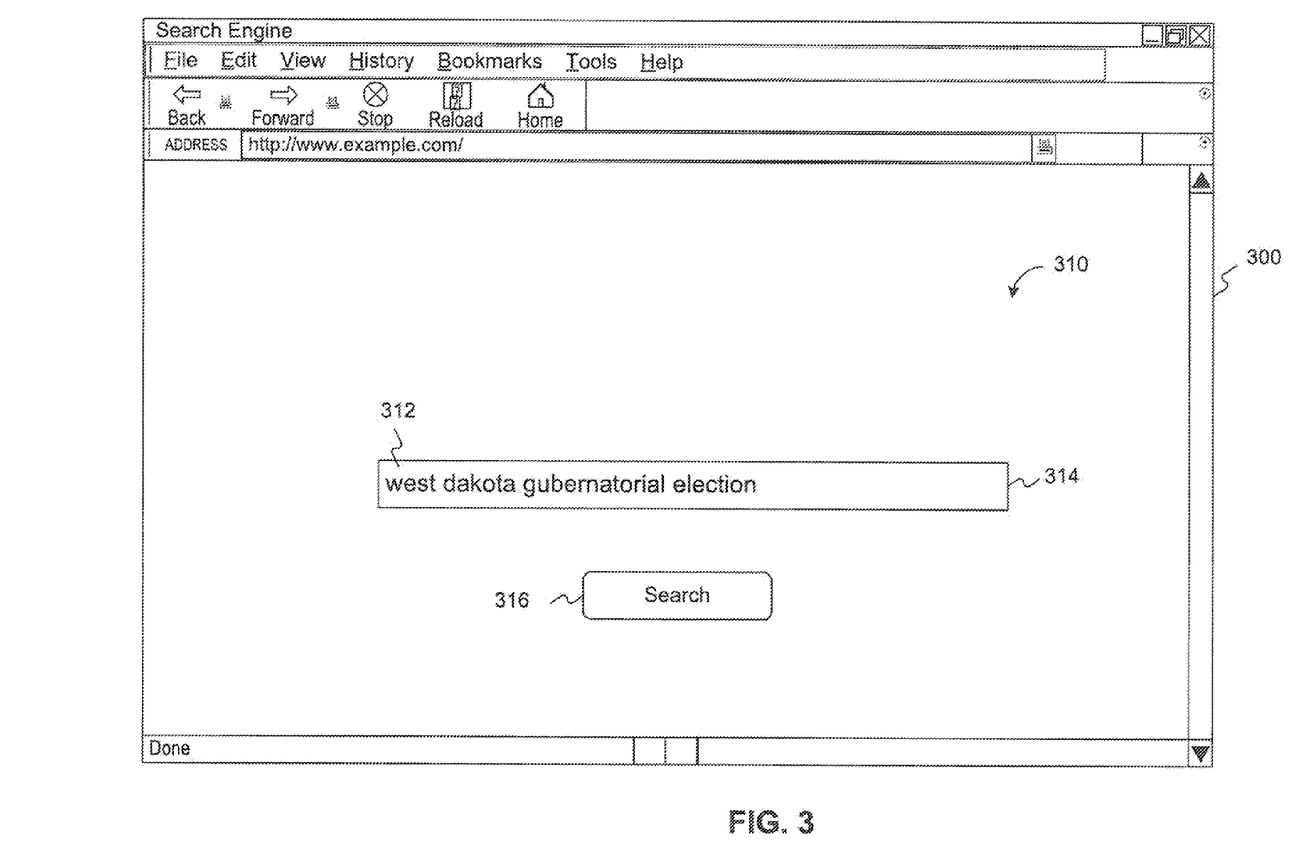
FIG. 3 is a diagram depicting an example interface through which a client device may request search results, consistent with certain disclosed implementations.

For example, as depicted in FIG. 3, a search request may be initiated by a user navigating to a webpage 310 maintained by a search engine using a web browser application 300. The user may type one or more search terms 312 into a textbox 314 in the search engine webpage and may request search results by submitting the search request using a webpage button 316. Upon pressing webpage button 316, web browser 300 may send a hypertext transfer protocol (HTTP) request to server 130 that includes search terms 312—for example, in the form of HTTP GET uniform resource locator (URL) or HTTP POST payload key-value pairs.

Those skilled in the art will appreciate that the foregoing method of requesting search results is merely one example of a method of requesting search results. For example, in other implementations, a user could have typed in search terms into a textbox supplied by web browser application 300, clicked on a hyperlink that provides search terms to the search engine in the form of URL key-value pairs, etc. Or, the search could have been initiated by automatic means through the browser itself or another application executing on client 110.

In step 202, server 130 receives the search request from client 110 and extracts the search terms 312. In step 203, server 130 retrieves search results from a search index using the search terms. As noted above, the search index may be maintained either by search engine server 130 itself or by a separate search index server 140. In either case, server 130 may retrieve two distinct sets of search results from the search index. Or, server 130 may retrieve a single set of search results from which two distinct subsets may be derived.

Server 130 may retrieve a first set of search results that includes a list of webpages and/or URLs that are most relevant to the supplied search terms according to one or more relevancy criteria. In this manner, server 130 may function as a conventional search engine. However, as an additional enhancement, server 130 may also retrieve a second set of search results that includes a list of the most recent or newest webpages and/or URLs that are relevant to the supplied search terms.

For example, the search index may return a list of search results corresponding to webpages that have been added to the search index within a time period commencing 60 seconds before the client's search request. In other implementations, the currency or newness of a webpage within the index may correspond to the date and time that the webpage was created or modified by its owner. Other methods of ordering webpages within the search index according to an oldest-to-newest continuum may also be used. In any implementation, ordering may be performed by consulting one or more timestamps associated with each search result.

The second set of search results may be provided to client 110 as a first installment in a continual process of streaming new search results. However, in order to provide meaningful streaming results that do not contain duplicate results that were previously transmitted to the client, records may need to be kept concerning which streaming results have already been sent to the client. In some implementations, this information may be encoded within a state string that is sent to the client and returned by the client as part of the next request for relevant streaming results. Example techniques for performing these operations are described with respect to steps 204 through 213.

Figure 4:
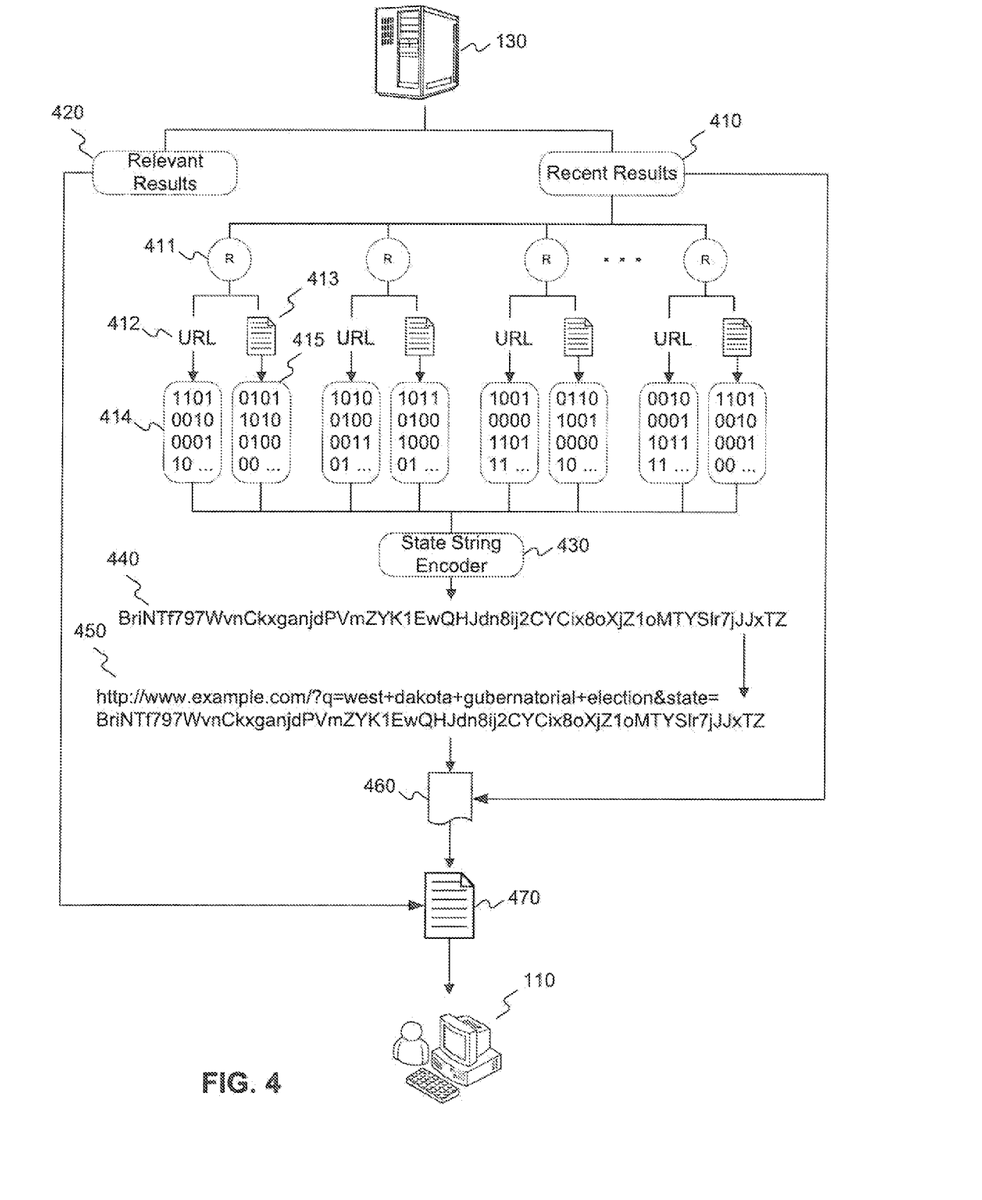
FIG. 4 is a diagram depicting an example method of encoding data representing streaming search results in a state string and polling URL transmitted to a client device, consistent with certain disclosed implementations.

In step 204, server 130 may generate a URL representing both the search terms submitted by the client and the first set of streaming results relevant to those search terms transmitted to the client. This URL may be referred to as a "polling URL," since it may be used by the client to periodically poll the server for new search results that have been added to the search index in between polling requests. For example, as depicted in FIG. 4, search engine server 130 may receive a set of recent search results 410 from a search index. Each recent search result 411 may be associated with a URL 412 and content 413. URL 412 may be a link to a webpage that was determined to be relevant to the supplied search terms, and content 413 may be a full, partial, digest, or other kind of copy of the content (e.g., text) included in the webpage.

Doc IDs

In some implementations, a 64-bit hash (or other type of digest) of URL 412 may be generated to uniquely identify the webpage by its URL. In some implementations, a search index may already have such a URL hash stored in memory in the form of a document identification ("doc ID"), such as a number or string, to uniquely identify the webpage and/or its URL. Thus, the search index may simply provide doc IDs for each recent search result 411 provided to server 130. Alternatively, server 130 may generate a doc ID 414 for each recent search result 411. In FIG. 4, doc IDs 414 are depicted as excerpted pseudo-binary hashes for purposes of illustration only.

Those skilled in the art will appreciate that there may be other techniques used to generate doc IDs that uniquely identify a particular URL and/or webpage indexed in the search index or returned as a search result. Those skilled in the art will also appreciate that, as with most or all hashing techniques, doc IDs generated by hashing may not be perfectly collision-resistant (e.g., collisions might occur with a probability of $2^{64}$), but may nevertheless be considered "unique" in a practical sense.

Generating a doc ID 414, such as a 64-bit hash, for each recent search result 411, may allow each URL 412 to be represented in both a compact and uniform manner. Moreover, by generating a doc ID that uniquely represents each recent result URL 412, server 130 can ensure that it does not identify duplicative webpages to client 110 during the course of streaming relevant results to client 110 as they are added to the search index.

For example, a given webpage may have been indexed by search index server 140 less than 60 seconds prior to the original search request made by client 110 (step 201). If that webpage is determined to have content that matches search terms 312, then search index server 140 may include that webpage as one of the recent results set 410 provided to search engine server 130. And, as further described below, that webpage may be provided as part of the streaming search results transmitted to client 110. However, if that webpage is later re-indexed within search index server 140, or is otherwise assigned a new and more recent timestamp for any reason, then the possibility exists that that webpage will again be identified as a recent search result and will again be provided to client 110 as a duplicative streaming search result.

Therefore, in some implementations, server 130 may use doc IDs 414 to ensure that duplicate streaming search results are not transmitted to client 110. For example, as further described below, prior to transmitting any new streaming search results to client 110, server 130 may inspect each doc ID 414 of each recent search result 411 to determine whether a search result with the same doc ID was previously transmitted to the client (hereinafter "document duplicate"). Where doc IDs 414 are generated based on URLs 412, a document duplicate may refer to a recent search result 411 for which a document with an identical URL 412 was previously transmitted to client 110.

Content IDs

In some implementations, server 130 may also take steps to avoid streaming duplicative content to client 110 when that content is embodied within otherwise distinct search results 411. For example, a particular news story by a news agency, such as the Associated Press™, may be distributed to multiple news organizations, each of which may publish the story as a webpage on their respective websites. Because each news organization's webpage may be associated with a different URL, each such webpage may be represented by a different doc ID 414 if doc IDs 414 are generated based on URLs 412. Similarly, a content provider may publish identical or substantially similar content with multiple webpages or may enable a single webpage to accessed using multiple distinct URLs. Or, in some cases, content may be duplicated by one or more mirror sites, or a second website operator may have copied a first website operator's content.

In any of these or similar cases, identical or substantially similar webpages may be assigned different doc IDs. As a result, even if document duplicates are removed from recent search results 410 prior to transmission to client 110, client 110 may nevertheless receive a number of streaming search results that are duplicative in terms of content (hereinafter "content duplicates").

Therefore, the present disclosure provides for certain enhancements that enable content duplicates to be detected and removed from streaming search results transmitted to a client. In some implementations, for each recent search result 411, server 130 may generate a content ID 415 that identifies the content 413 of the search result. For example, server 130 may generate a 64-bit hash of the entire content 415 or a particular portion of the content 415. Thereafter, as further described below, server 130 may refrain from transmitting to client 110 any recent search results 411 having content IDs that match search results that were previously transmitted to client 110.

Maintaining Client-Side State Information Related to Received Search Results

The above described techniques for generating doc IDs and content IDs may be used to effectively and uniformly identify distinct documents and content that have already been transmitted to a client. However, in order to reduce duplicative streaming search results, it may be necessary to maintain in memory a list of the doc IDs and content IDs associated with search results that have previously been transmitted to client 110. Moreover, if streaming search results are provided to multiple clients, such state information may need to be maintained in memory for each distinct client. In some implementations, such state information may be maintained in memory by server 130 or another device to which server 130 has access.

In other implementations, in order to reduce the amount of information needed to be stored in memory by server 130, and to avoid problems of determining when state information has become "stale" for a given client, each client 110 may maintain its own state information with respect to receive streaming results. Streaming state information may be transmitted to client 110, stored in memory by client 110, and used by client 110 and/or server 130 in a number of different ways to reduce duplicative streaming results. However, in one example implementation, such state information may be provided to client 110 in the form of a state string embedded into a polling URL that client 110 may use to request updated streaming search results from server 130. Example operations for performing this implementation will now be described with respect to FIG. 4.

As described above, a doc ID 414 and a content ID 415 may be generated or retrieved for each recent search result 411—for example, in the form of 64-bit binary hashes. Server 130 may then encode doc IDs 414 and content IDs 415 into a state string 440 using a state string encoder process 430. In some implementations, state string encoder 430 may convert doc IDs 414 and content IDs 415 into alphanumeric, URL-compliant character strings, and may concatenate all such alphanumeric strings into a single state string 440. In some implementations, to prevent client-side tampering with state string 440, or to otherwise introduce security elements, server 130 may also encrypt state string 440 with a symmetric or asymmetric key, or may obfuscate or hash state string 440 in a manner known only server 130 or another device or entity associated with server 130.

Server 130 may then insert state string 440 into a polling URL 450—for example, as a URL key-value pair parameter. Polling URL 450 may include a domain name (or sub-domain name) hosted by server 130, such that an HTTP request by client 110 using URL 450 may be received by server 130 or another server in the same domain. Polling URL 450 may also include the search terms 312 that were used to generate both the relevant results 420 and the recent results 410. In FIG. 4, polling URL 450 is depicted as spanning multiple lines for illustration purposes.

Polling URL 450 may be transmitted to client 110 and used by client 110 to request additional streaming search results from server 130 (or another server) at a later time. In one example implementation, server 130 may transmit a client-executable program, such as a JavaScript program, that, when executed by client 110, instructs client 110 to make periodic requests for streaming search results using polling URL 450. Thus, as depicted in FIG. 4, polling URL may be incorporated into client-side streaming code 460.

Returning to FIG. 2A, in step 205, server 130 may send a response (e.g., an HTTP response) to client 110 that includes the most relevant results, the newest streaming results, client-side streaming code, and a polling URL. As depicted in FIG. 4, these operations may be performed by incorporating recent results 410 into client-side streaming code 460 (which may itself incorporate state string 440 and polling URL 450), and incorporating both relevant results 420 and client-side streaming code 460 into response data 470. For example, response data 470 may be a hypertext markup language (HTML) document that includes relevant results 420 in the body of the document (e.g., using HTML "<li>" elements) and client-side streaming code 460 within an HTML "<script>" element. In other implementations, relevant results 420, recent results 410, state string 440, polling URL 450, and/or client-side streaming code 460 may be provided to client 110 using other techniques.

Client-Side Streaming Operations

Figure 5:
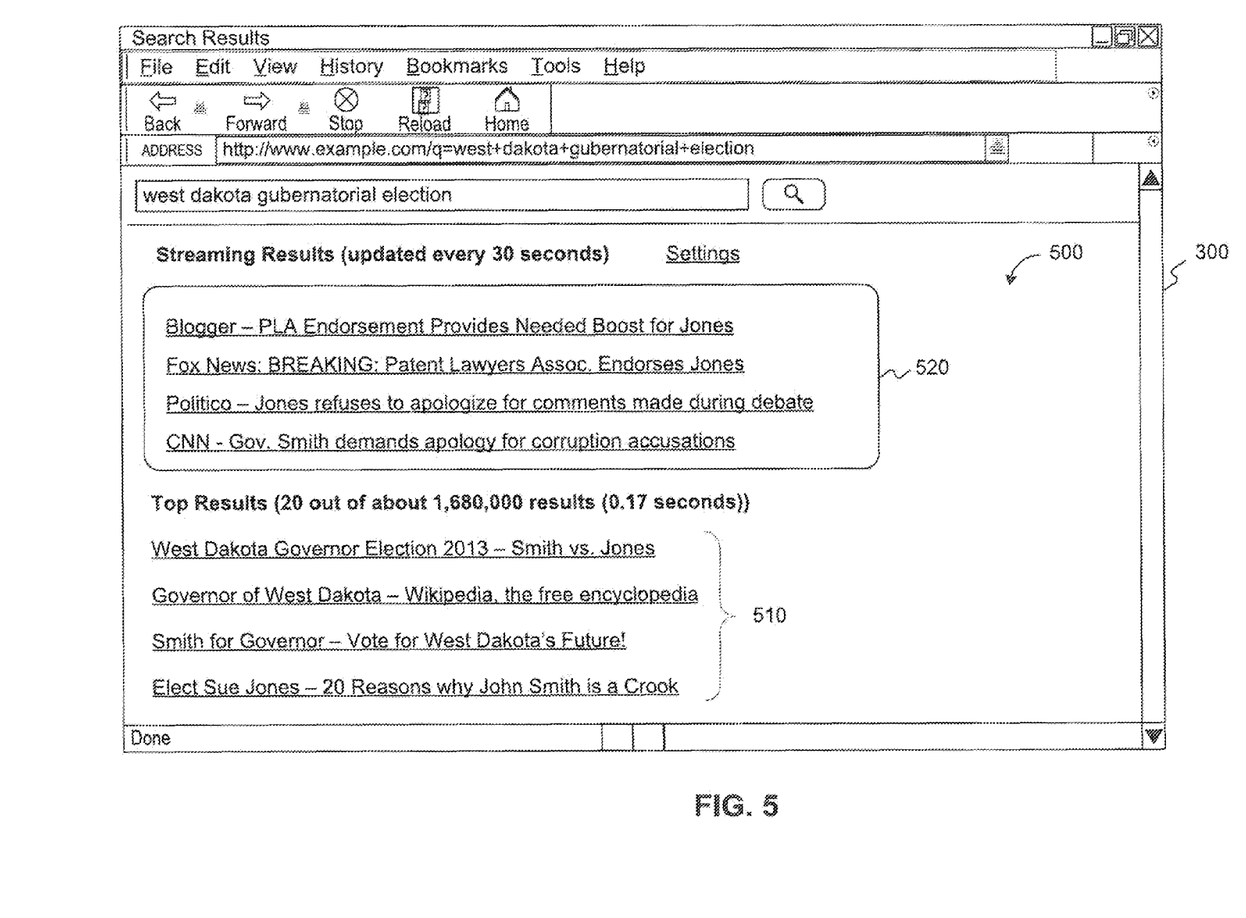
FIG. 5 is a diagram depicting an example search engine webpage that provides for display of relevancy-based search results and streaming search results, consistent with certain disclosed implementations.

Once client 110 receives response data 470, in step 206, client 110 may display both the received relevant search results and the streaming results. For example, as depicted in FIG. 5, client 110 may render and display response data 470 in the form of a webpage 500 using browser 300. In particular, webpage 500 may contain an area 510 that displays the received relevant results 420 in a manner similar to that of conventional static search engine results.

Webpage 500 may also contain an area 520 that displays the received recent search results 410 in a streaming manner. For example, client-side streaming code 460 may instruct browser 300 to display a new link to a recent search result 411 every six seconds (or other interval), ordered by timestamp, in a scrolling manner.

In step 207, client-side streaming code 460 may also instruct browser 300 to wait for a certain period of time (e.g., 60 seconds) before requesting a new set of streaming search results using polling URL 450. In some implementations, in order to preserve the static nature of sections of webpage 500 other than streaming area 520, client-side streaming code 460 may employ asynchronous JavaScript and eXtensible Markup Language (AJAX) techniques to communicate with server 130. Using AJAX, or other similar background or asynchronous HTTP request mechanisms, client 110 may request new streaming search results from server 130 without the need to make page-wide HTTP requests that would cause the reloading or refreshing of webpage 500 as a whole.

Server-Side De-Duplication Operations

Turning to FIG. 2B, in step 208, server 130 may receive the request from client 110 for the new set of streaming search results made using polling URL 450. In step 209, server 130 may extract from polling URL 450 the search terms 312 for which updated streaming results are sought, as well as the encoded information indicating which streaming search results client 110 has already received.

In one implementation, server 130 may determine which streaming search results client 110 has already received by applying the same or similar operations described with respect to FIG. 4 in reverse order. For example, server 130 may extract state string 440 from polling URL 450. Server 130 may then divide the data representing the alphanumeric characters in state string 440 into 64-bit segments, from which constituent doc IDs 414 and content IDs 415 may be derived. Server 130 may also perform any additional transformations necessary to decrypt, de-hash, or de-obfuscate state string 440, if necessary.

In step 210, server 130 may retrieve newly added results from the search index using the search terms extracted from polling URL 450. In some implementations, newly added results may correspond to webpages or other documents that have been created, modified, or added to the search index since server 130 last retrieved recent search results from the search index for streaming to client 110. Alternatively, server 130 may simply request any matching items in the search index that have been created, modified, or added to the search index within a recent time period, such as items having timestamps within the last 60 seconds before server 130's request. Using the latter approach, the timespan of qualifying newly added documents may simply be assumed to match or correspond to the period according to which client-side streaming code 460 instructs client 110 to request updated streaming results (e.g., taking into account any assumed delays introduced by transmission or processing delays).

In step 211, server 130 may remove duplicative results from the newly retrieved search results representing content or webpages that have already been transmitted to client 110.

Figure 6:
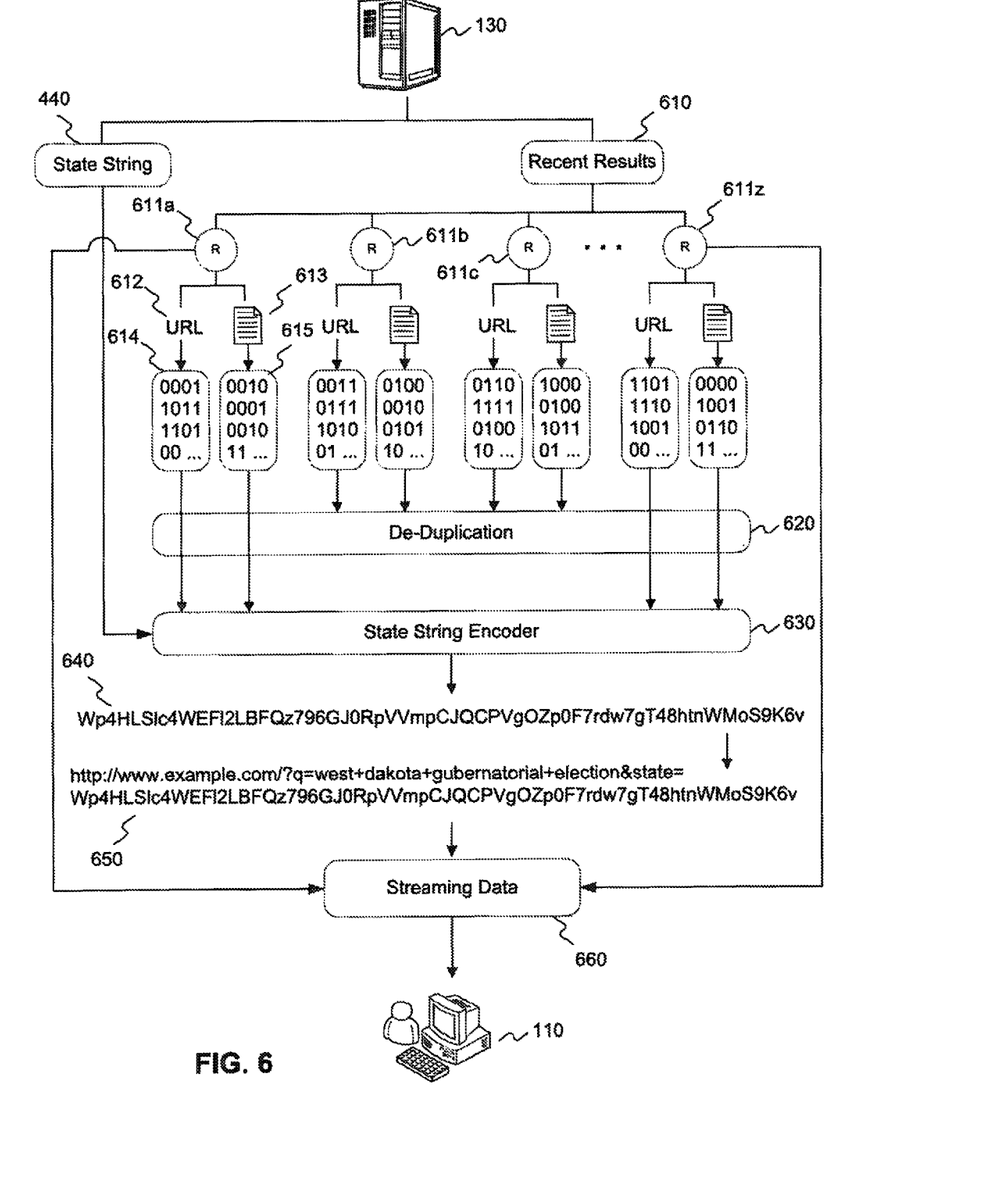
FIG. 6 is a diagram depicting an example method of removing duplicate entries from streaming search results transmitted to a client device using a state string provided by the client device, consistent with certain disclosed implementations.

Example operations for performing such a de-duplication process are depicted in FIG. 6.

Similar to the operations described with respect to FIG. 4, server 130 may retrieve a set of recent results 610 from the search index—for example, corresponding to items that are relevant to search terms 312 that were added to the search index since the set of recent results 410 was retrieved from the search index. Each search result, such as recent search result 611a, may be associated with both URL 612 and content 613.

Once again, similar to the operations described with respect to FIG. 4, server 130 may retrieve or generate a doc ID, such as a 64-bit hash, and a content ID for URL 612 and content 613, respectively. Server 130 may perform these operations for each recent search result, such as recent search results 611a, 611b, 611c, and 611z, as depicted in FIG. 6.

Server 130 may then subject each recent search result to a de-duplication process 620. In some implementation's, de-duplication process 620 may involve examining each doc ID to determine whether the doc ID is already represented in state string 440. If the doc ID is already represented in state string 440, then it may be deduced that client 110 had previously received the recent search result associated with the doc ID. Accordingly, server 130 may refrain from sending that recent search result to client 110 in the current batch of streaming search results.

Similarly, server 130 may examine each content ID to determine whether the content ID is already represented in state string 440. If the content ID is already represented in state string 440, then it may be deduced that client 110 had previously received a recent search result having similar or identical content to that of the recent search result associated with the content ID. Accordingly, server 130 may refrain from sending that recent search result to client 110 in the current batch of streaming search results.

Thus, in some implementations detecting either a duplicate doc ID (document duplicate) or a duplicate content ID (content duplicate) may be sufficient to exclude a particular recent search result, even if only one of the doc ID or the content ID is determined to be a duplicate. In other implementations, a recent search result having a duplicative doc ID may not be excluded if its content ID is not also found to be duplicative. In that scenario, it might be assumed, for example, that the content published in a particular webpage has sufficiently changed such that the new content may be transmitted as a streaming search result to client 110, despite the duplicative doc ID or URL.

In FIG. 6, doc IDs and content IDs associated with recent search results 611a and 611z are depicted as passing through de-duplication process 620. Thus, for both recent search result 611a and recent search result 611z, no matching doc ID or content ID was found in state string 440, and neither is regarded as a duplicate result. By contrast, doc IDs and content IDs associated with recent search results 611b and 611c are depicted as stopping at de-duplication process 620. Thus, for both recent search result 611b and 611c, a doc ID and/or content ID was found to already be represented in state string 440, and thus both are regarded as duplicate results.

Because recent search results 611a and 611z have been found to be non-duplicative, their doc IDs and content IDs are then passed to state string encoder 630. Similar to operations described with respect to FIG. 4, state string encoder 630 may convert the doc IDs and content IDs into alphanumeric, URL-compliant character strings.

In some implementations, it may be desirable to maintain state information about which streaming search results client 110 has received during the course of multiple trips to server 130. Therefore, rather than creating a new state string that represents only the new recent search results 611a and 611z, state string encoder 630 may instead modify incoming state string 440 to represent new recent search results 611a and 611z as additional state information. Accordingly, as depicted in FIG. 6, state string encoder 630 may output a modified state string 640 that represents both doc IDs and content IDs of new recent search results 611a and 611z, as well as some or all of the doc IDs and content IDs represented in original state string 440.

Returning to FIG. 2B, in step 212, server 130 may modify the polling URL to represent any additional streaming search results sent to the client. Thus, in FIG. 6, a new or modified polling URL 650 is generated that includes modified state string 640.

In step 213, server 130 may send a response to client 110 that includes the newest, non-duplicative streaming search results and the modified polling URL. These operations are depicted in FIG. 6, in which server 130 transmits streaming data 660 to client 110 that includes new recent search results 611a and 611z, and modified polling URL 650.

In some implementations, because client 110 has already received client-side streaming code 460, it may not be necessary for server 130 to transmit any new or additional client-side code as part of streaming data 660. Likewise, because relevant results 420 correspond to static search results that are not intended for streaming, streaming data 660 may not include any new or additional conventional search results. In other implementations, streaming data 660 may include new or additional client-side code, conventional search results, or other data.

Figure 7:
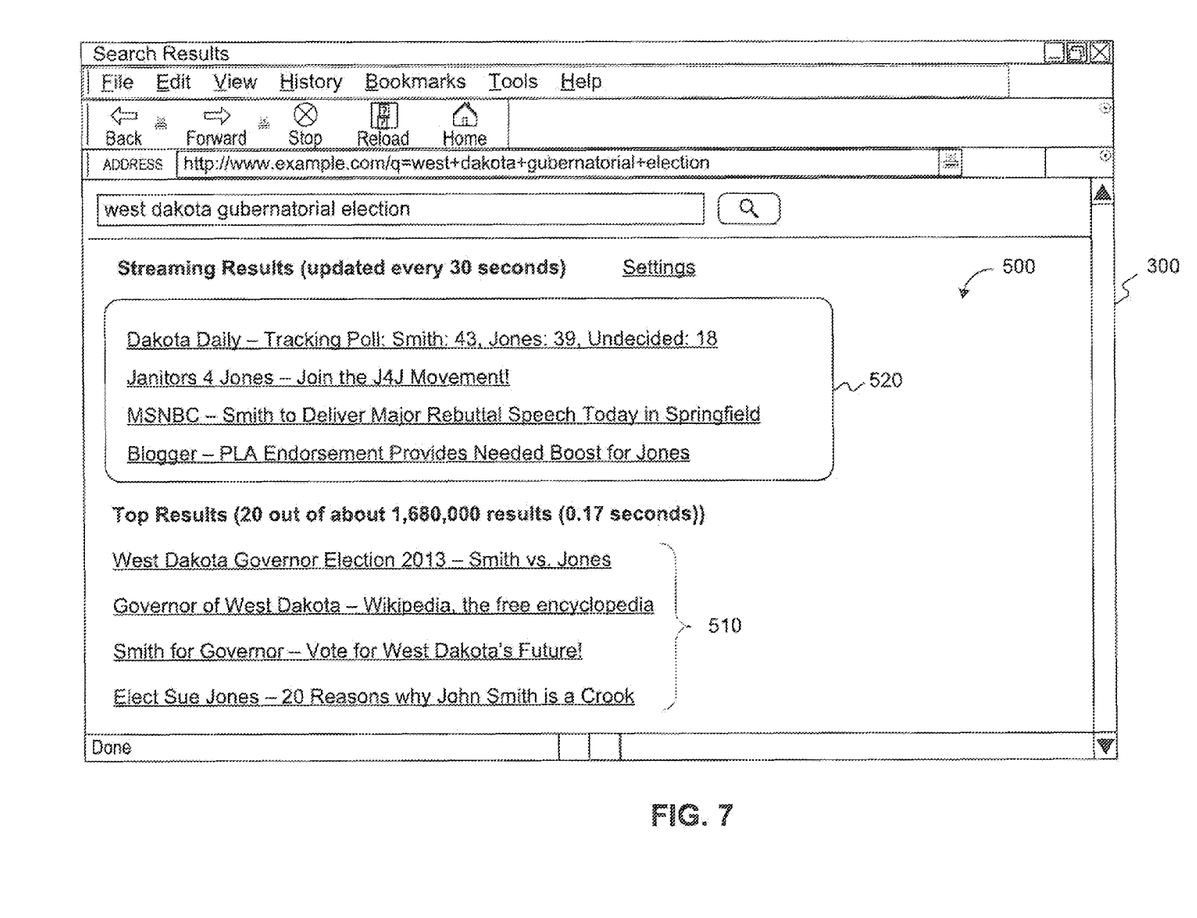
FIG. 7 is a diagram depicting an example search engine webpage in which streaming search results have been updated, consistent with certain disclosed implementations.

In step 214, client 110 receives the new streaming search results and updates its display accordingly. For example, FIG. 7 depicts webpage 500 as it might appear after client 110 and browser 300 have received streaming data 660. As depicted in FIG. 7, streaming area 520 has been updated to display three new recent search results, while some of the previously displayed streaming search results have been scrolled off of the display. At the same time, the conventional search results displayed in area 510 remain unchanged. Those skilled in the art will appreciate that there may be other ways to update the display of streaming search results as they are received by client 110 or browser 300.

After client 110 updates its display to represent the newly received streaming search results, it may return to step 207. Thus client 110 may again wait for a specified period of time before requesting another updated set of streaming search results from server 130, this time using modified polling URL 650. Client 110 and server 130 may perform steps 207 through 214 in a loop-like manner such that client 110 is able to display new streaming search results in area 520 as they are created in the search index.

Enhancements for Limiting State String Size

As described with respect to FIG. 6, rather than creating a new state string representing only new streaming search results 611a and 611z, state string encoder 630 may modify incoming state string 440 to represent new streaming search results 611a and 611z as additional received search results. For example the doc IDs and content IDs associated with new streaming search results 611a and 611z may simply be prepended or appended to state string 440 to generate modified state string 640.

Using this technique, server 130 may be able to avoid transmitting duplicative streaming search results to client 110 even if those duplicates span multiple iterations of steps 207 through 214. However, if the streaming process continues for an extended period of time and the number of non-duplicative results transmitted to client 110 continues to grow during that time, then the state string may become impractically large or may cause the polling URL to exceed maximum size restrictions. Therefore, in some implementations, the state string modification process may be improved to allow some older doc IDs and/or content IDs to be dropped from the state string.

For example, if server 130 is able to associate a doc ID or a content ID with a timestamp, then server 130 may drop the doc ID or content ID from the state string after a certain amount of time has elapsed from the timestamp. This approach may be considered a time-based approach for determining when to drop doc IDs or content IDs from the state string.

Additionally or alternatively, server 130 may allocate a maximum number of doc IDs and a maximum number of content IDs that may be encoded in a state string. For example, client-side streaming code 460 may be configured to display a new streaming search result to client 110 every six seconds (irrespective of how many new streaming search results client-side streaming code 460 may retrieve during each update from server 130). If it is desired to represent one minute's worth of document duplicates in the state string, then the state string may be limited to storing 10 doc IDs. Accordingly, as new doc IDs are added to the state string, older doc IDs may be dropped as necessary to maintain only 10 doc IDs in the state string.

Similarly, server 130 may allocate space for a maximum of 50 content IDs in the state string, which may correspond to approximately five minutes' worth of non-duplicative content. Accordingly, as new content IDs are added to the state string, older content IDs may be dropped as necessary to maintain only 50 content IDs in the state string. In particular, allocating one minute's worth of non-duplicative documents and five minutes' worth of non-duplicative content may correspond to an estimated attention or memory span of a typical user. As a result, document duplicates or content duplicates that are transmitted to client 110 outside of the one-minute and five-minute windows, respectively, may not be noticed by a typical user or may not significantly diminish the user experience in receiving streaming search results. Other allocations or timings may be used to limit the size of the state string. In some cases, the state string may include only doc IDs or only content IDs.

Additional Enhancements

The de-duplication process may be relaxed as necessary to ensure that client 110 receives enough results with each polling request to maintain a continuous streaming display in browser 300. For example, server 130 may be configured to transmit the best or most relevant five new search results from the search index with each new polling request from client 110 (corresponding to one minute's worth of streaming results if client 110 displays a new streaming result every six seconds). In some cases, removing all document and content duplicates from the results obtained from the search index could result in fewer than five new, non-duplicative search results that could be sent to client 110 for a particular polling request. In those cases, server 130 may allow some duplicate results to be sent to client 110 to ensure that client 110 receives at least five new streaming search results. For example, server 130 may allow the most relevant content duplicates to be used, followed by document duplicates, if necessary, or vice-versa.

In addition to document duplicates and content duplicates, server 130 may remove additional recent search results retrieved from the search index according to one or more criteria. For example, certain kinds of websites that a typical user would not be interested in seeing in the streaming search results may be excluded as spam.

Additional techniques may also be used to limit the size of a state string. In some implementations, rather than encoding full doc IDs or content IDs in the state string, only portions of doc IDs or content IDs may be encoded. For example, if only the first 63 bits of the 64-bit IDs are encoded in the state string, then the total size of the state string may be reduced. This reduction may come at the expense of a very slight increase in the likelihood that two different IDs will be identified as duplicates because they share the same first 63 bits (albeit a different final bit).

Thus, with each reduction in the portion of doc IDs and content IDs that are encoded, the size of the state string may be reduced at the expense of an increased rate of false positives. In some cases, it has been empirically determined that using 21-bit portions of the 64-bit doc IDs and content IDs represents an optimal tradeoff between state string size and the risk of false positives, with the risk of false positives being only approximately only $\frac{1}{1000}$. Therefore, in some implementations, a 21-bit subset (or other subset) of doc IDs and content IDs may be encoded in the state string to reduce its size. Any such improvements in the size of the state string may also be used to increase a maximum number of doc IDs and/or content IDs that may be imposed on the state string.

Example Hardware Implementation

Figure 8:
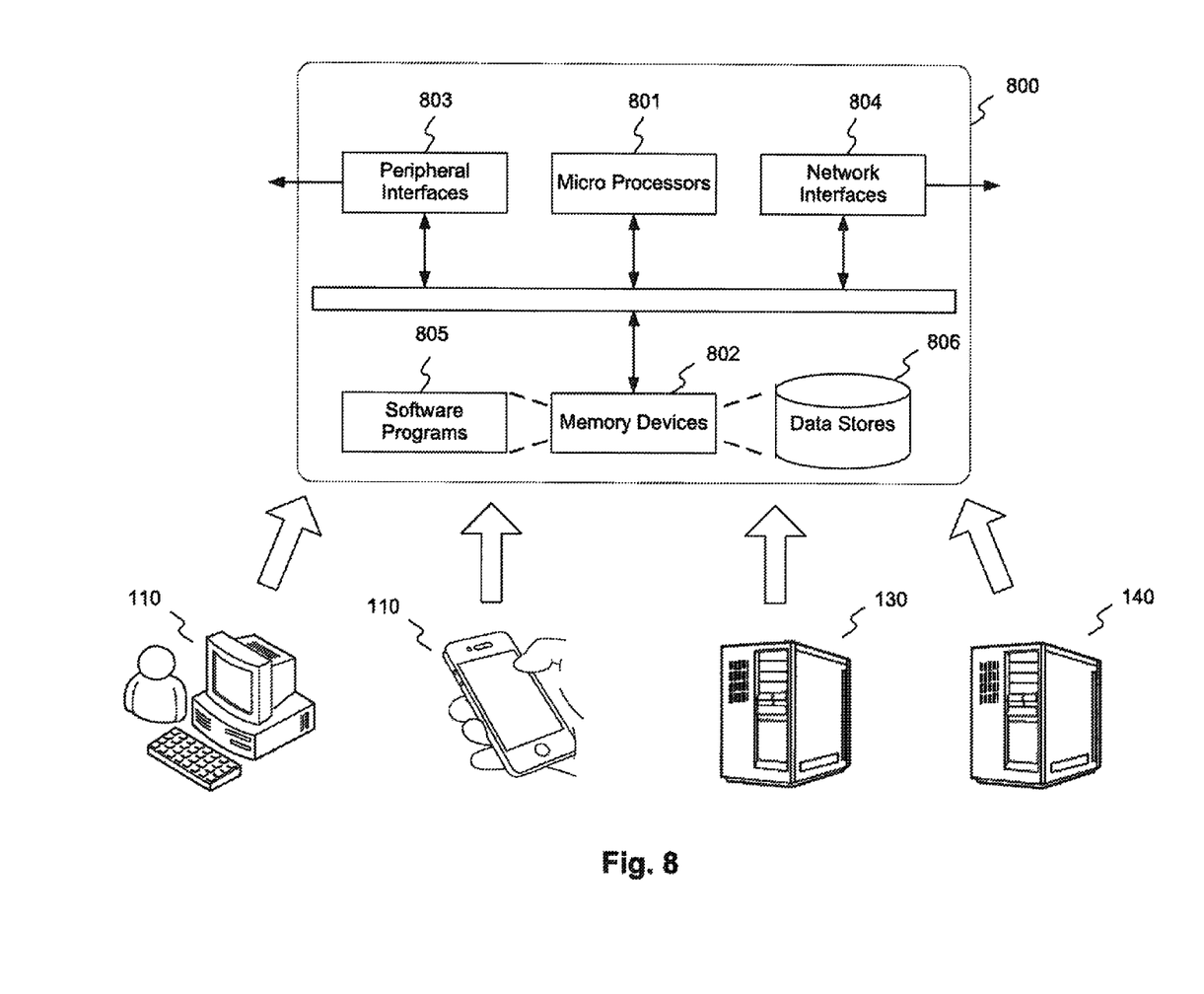
FIG. 8 is a diagram depicting an example hardware configuration of a client device, search engine web server, and/or search index server, consistent with certain disclosed implementations.

FIG. 8 is a diagram depicting an example hardware configuration for various devices that may be used to perform one or more operations of the described implementations. As depicted in FIG. 8, client device 110 may be a personal computing device, such as a desktop or laptop computer; a mobile device, such as a smartphone or tablet; or a different type of client device, such as a kiosk terminal, thin client, etc. Search engine server 130 and/or search index server 140 may be conventional server devices, such as rack-mounted servers or other devices capable of servicing client requests.

Any of devices 110, 130, and 140 may comprise one or more microprocessors 801 of varying core configurations and clock frequencies; one or more memory devices or computer-readable media 802 of varying physical dimensions and storage capacities, such as flash drives, hard drives, random access memory, etc., for storing data, such as images, files, and program instructions for execution by one or more microprocessors 801; one or more network interfaces 804, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc.; and one or more peripheral interfaces 803, such as keyboards, mice, touchpads, computer screens, touchscreens, etc., for enabling human interaction with and manipulation of devices 110, 130, or 140. In some implementations, the components of devices 110, 130, or 140 need not be enclosed within a single enclosure or even located in close proximity to one another.

Memory devices 802 may further be physically or logically arranged or configured to provide for or store one or more data stores 806, such as one or more file systems or databases, and one or more software programs 805, which may contain interpretable or executable instructions for performing one or more of the disclosed implementations. Those skilled in the art will appreciate that the above-described componentry is merely one example of a hardware configuration, as devices 110, 130, and 140 may comprise any type of hardware componentry, including any necessary accompanying firmware or software, for performing the disclosed implementations. Devices 110, 130, and 140 may also be implemented in part or in whole by electronic circuit components or processors, such as application-specific integrated circuits (ASICs) or field-programmable gate arrays (FPGAs).

Data Source and Implementation Independence

Although the foregoing implementations have been described primarily in the context of a single client 110 that is serviced by making periodic polling requests to a single search engine server 130 that retrieves search results from a single search index server 140, the present disclosure is not limited to such an arrangement. Because client 110 is able to maintain all necessary state, client 110 need not interface with the same search engine server 130 during each polling request.

Rather, in some implementations, client 110 may simply make each polling request to the domain or sub-domain indicated in the polling URL. If the owner of the domain uses multiple different servers to service requests to the domain, then each individual polling request from client 110 may conceivably be serviced by a different search engine server. However, provided client 110 transmits its search terms and its current state string with each such request, then each different search engine server should be able to service the request. Thus, references to server 130 in the foregoing description may be understood to refer to a server system, such as a group of potentially different servers under common ownership and/or control, rather than an individual server per se.

Moreover, search index server 140 may not be limited to a single server or data source. Rather, each polling request from client 110 may result in a different search index server being queried for search results. Nor is it necessary that even the same data source be queried with each polling request. In some implementations, in order to maintain scalability, a search engine provider may maintain multiple, distinct search indexes that are not guaranteed to be perfectly redundant. For example, new webpages may be added to different search indexes at different times or with different degrees of success. Different search indexes may also index different kinds or populations of webpages, such that two given search indexes may not even be intended as approximate mirrors.

In these or other cases, the foregoing implementations may still operate smoothly to provide users with real-time or near real-time streaming search results. In particular, even if two different polling requests from client 110 result in two very different search indexes being queried, client 110 may nevertheless still receive streaming search results that are non-duplicative across the requests (even though another client might receive different streaming results for the same search terms on account of being serviced by a different search index). Thus, subsequent polling requests need not be made to the same server or be queried using the same or similar data source.

Moreover, although the described above implementations have focused on certain implementations for explaining certain concepts, the present disclosure is not limited to any one implementation. For example, state information may be maintained or transmitted using techniques other than state strings and polling URLs. In some implementations, state information may be maintained using HTTP cookies or otherwise transmitted using HTTP headers. State information may be represented by objects or data structures other than strings, such as serialized objects, binary or executable data structures, etc.

Similarly, client-side streaming code 460 need not be JavaScript, but may be any type of code or program capable of execution or interpretation on client 110, such as Flash™, SilverLight™, ActiveX™, Java™ applets, etc. Client-side streaming code 460 may alternatively operate as part of browser 300 itself, either as functionality native to browser 300 or as a plug-in, add-on, or extension to browser 300. In those cases, for example, it may not be necessary for server 130 to transmit client-side streaming code 460 to client 110.

The present disclosure is also not limited to search engine results or to webpages in general, but may be used to provide streaming results of any type (even if not search-related), from any data source, in a client-server arrangement. In some implementations, one or more of the above-described techniques may be used to provide non-duplicative streaming results of web or Internet content that do not amount to full or traditional webpages. For example, the present disclosure may be used to stream data items representing social network events, such as Google+™ posts, Facebook™ status updates, Twitter™ tweets, etc. In any of these or other cases, some data items may not have a unique URL, or even any URL to uniquely the data item. In some implementations, for data items that are not represented by URLs or by unique URLs, other data representing the data items may be used as doc IDs. Or, in some cases, doc IDs may not be used, and de-duplication operations may instead rely entirely or primarily on identifying content duplicates. Other techniques may also be used to reduce duplicates for data items that do not have associated doc IDs.

Communications need not be effected using HTTP or transmission control protocol (TCP), but may be made using any suitable protocol within or apart from the Open Systems Interconnection (OSI) model stack. Likewise, streaming results need not be represented or displayed using HTML, but any suitable formatting or display technology may be used. Accordingly, the present disclosure need not be implemented using a web browser, but may be implemented using any suitable application, program, or process, whether executing in whole or in part on client 110.

The foregoing description of the present disclosure, along with its associated implementations, has been presented for purposes of illustration only. It is not exhaustive and does not limit the disclosure to the precise forms disclosed. Those skilled in the art will appreciate from the foregoing description that modifications and variations are possible in light of the above teachings or may be acquired from practicing the disclosed implementations.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described implementations, but instead is defined by the appended claims in light of their full scope of equivalents.

In the above description and in the below claims, unless specified otherwise, the term "executable" and its variants are to be interpreted as including any operation of program code or instructions on a device, whether compiled, interpreted, or run using other techniques. Also, in the below claims, unless specified otherwise, the term "data store" may comprise multiple distinct data sources, such as multiple search indexes, even if those multiple search indexes do not contain identical items or content.

What is claimed is:

1. A computer-implemented method of providing non-duplicative search results, comprising:
   receiving from a client a first query comprising one or more search terms;
   obtaining a first list of search results relevant to the one or more search terms;
   generating a polling URL comprising one or more respective unique identifiers of each of the search results of the first list, each respective unique identifier representing content of a respective search result;
   sending a first response to the client that includes the first list of search results and the polling URL;
   identifying, from the polling URL, the one or more search terms and the one or more respective unique identifiers of each of the search results of the first list;
   obtaining a second list of search results relevant to the one or more search terms;
   identifying one or more respective unique identifiers representing content of each of the search results of the second list that match at least one of the one or more respective unique identifiers of a search result included in the polling URL;
   updating the second list by removing one or more search results having the identified matching unique identifiers;
   modifying the polling URL to include the respective unique identifiers of each remaining search result of the updated second list; and
   sending a second response to the client that includes the updated second list and the modified polling URL.

2. The method of claim 1, wherein the first list of search results includes search results that have been added to a data store within a specified period of time before the first query.

3. The method of claim 1, wherein the first response further comprises a list of search results most relevant to the search terms.

4. The method of claim 1, wherein generating the polling URL comprises:
   encoding information that identifies URLs associated with the first list of search results in respective identifiers.

5. The method of claim 4, wherein removing the one or more search results comprises:
   removing from the second list of search results one or more search results having URLs identified by identifiers in the polling URL.

6. The method of claim 1, wherein generating the polling URL comprises:
   encoding information representing content of documents identified by the first list of search results in respective identifiers.

7. The method of claim 6, wherein encoding information representing content of documents comprises:
   computing a respective hash of a portion of content of each document.

8. The method of claim 1, wherein
   the polling URL includes the one or more search terms.

9. The method of claim 1, wherein the first response further comprises client-executable code that instructs the client to send periodic queries for updated search results using the polling URL.

10. The method of claim 1, wherein the identified matching unique identifiers represent duplicate content in respective search results of respective lists.

11. A system configured to provide non-duplicative search results, the system comprising:
    a processing system comprising one more processors; and
    a memory system comprising one or more computer-readable media, wherein the one or more computer-readable media contain instructions stored thereon that, when executed by the processing system, cause the processing system to perform operations comprising:
       receiving from a client a first query comprising one or more search terms;
       obtaining a first list of search results relevant to the one or more search terms;
       generating a polling URL comprising one or more respective unique identifiers of each of the search results of the first list, each respective unique identifier representing content of a respective search result of the first list;
       sending a first response to the client that includes the first list of search results and the polling URL;
       identifying, from the polling URL, the one or more search terms and the one or more respective unique identifiers of each of the search results of the first list;
       obtaining a second list of search results relevant to the one or more search terms;
       identifying one or more respective unique identifiers representing content of each of the respective search results of the second list that match at least one of the one or more respective unique identifiers of a search result included in the polling URL;
       updating the second list by removing one or more search results having the identified matching unique identifiers;
       modifying the polling URL to include the respective unique identifiers of each remaining search result of the updated second list; and
       sending a second response to the client that includes the updated second list and the modified polling URL.

12. The system of claim 11, wherein the first list of search results includes search results that have been added to a data store within a specified period of time before the first query.

13. The system of claim 11, wherein the first response further comprises a list of search results most relevant to the search terms.

14. The system of claim 11, wherein generating the polling URL comprises:
    encoding information that identifies URLs associated with the first list of search results in respective identifiers.

15. The system of claim 14, wherein removing the one or more search results comprises:
    removing from the second list of search results one or more search results having URLs identified by identifiers in the polling URL.

16. The system of claim 11, wherein generating the polling URL comprises:
    encoding information representing content of documents identified by the first list of search results in respective identifiers.

17. The system of claim 16, wherein encoding information representing content of documents comprises:
    computing a respective hash of a portion of content of each document.

18. The system of claim 11, wherein
    the polling URL includes the one or more search terms.

19. The system of claim 1, wherein the first response further comprises client-executable code that instructs the client to send periodic queries for updated search results using the polling URL.

20. The system of claim 11, wherein the identified matching unique identifiers represent duplicate content in respective search results of respective lists.

21. A non-transitory computer readable medium comprising instructions that when executed by one or more processors cause the one or more processors to perform operations comprising:

receiving from a client a first query comprising one or more search terms;

obtaining a first list of search results relevant to the one or more search terms;

generating a polling URL comprising one or more respective unique identifiers of each of the search results of the first list, each respective unique identifier representing content of a respective search result;

sending a first response to the client that includes the first list of search results and the polling URL;

identifying, from the polling URL, the one or more search terms and the one or more respective unique identifiers of each of the search results of the first list;

obtaining a second list of search results relevant to the one or more search terms;

identifying one or more respective unique identifiers representing content of each of the search results of the second list that match at least one of the one or more respective unique identifiers of a search result included in the polling URL;

updating the second list by removing one or more search results having the identified matching unique identifiers;

modifying the polling URL to include the respective unique identifiers of each remaining search result of the updated second list; and     sending a second response to the client that includes the updated second list and the modified polling URL.

22. The computer readable medium of claim 21, wherein generating the polling URL comprises encoding information that identifies URLs associated with the first list of search results in respective identifiers and encoding information representing content of documents identified by the first list of search results in respective identifiers.

\* \* \* \* \*